US011225220B2

(12) United States Patent
Eaton et al.

(10) Patent No.: US 11,225,220 B2
(45) Date of Patent: Jan. 18, 2022

(54) ENERGY ABSORBING DEVICES FOR USE WITH WEBS

(71) Applicant: Shield Restraint Systems, Inc., Elkhart, IN (US)

(72) Inventors: James Russell Eaton, Carmel, IN (US); Phillip Dale Morgan, Noblesville, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 153 days.

(21) Appl. No.: 16/373,978

(22) Filed: Apr. 3, 2019

(65) Prior Publication Data

US 2019/0308584 A1    Oct. 10, 2019

Related U.S. Application Data

(60) Provisional application No. 62/652,670, filed on Apr. 4, 2018.

(51) Int. Cl.
*B60R 22/28* (2006.01)
*B60R 22/10* (2006.01)
(Continued)

(52) U.S. Cl.
CPC ............ *B60R 22/28* (2013.01); *B60R 22/105* (2013.01); *B60R 22/12* (2013.01); *B60N 2/2809* (2013.01); *B60N 2002/2815* (2013.01)

(58) Field of Classification Search
CPC ....... B60R 22/28; B60R 22/105; B60R 22/12; B60R 2022/289; B60R 21/00;
(Continued)

(56) References Cited

U.S. PATENT DOCUMENTS

| 2,443,191 A | * | 6/1948 | Miller | A62B 35/00 |
| | | | | 297/471 |
| 4,027,905 A | * | 6/1977 | Shimogawa | B60R 22/28 |
| | | | | 297/472 |

(Continued)

FOREIGN PATENT DOCUMENTS

| CA | 2086479 | 7/1993 |
| CA | 2038122 | 11/2000 |

(Continued)

OTHER PUBLICATIONS

Translation of DE-102015224611-A1 accessed at www.espacenet.com on Aug. 7, 2020 (Year: 2017).*

(Continued)

*Primary Examiner* — James A Shriver, II
*Assistant Examiner* — Hilary L Johns
(74) *Attorney, Agent, or Firm* — Perkins Coie LLP (57) ABSTRACT

Energy absorbing devices for use with child seat restraint webs, seat belt webs, and other webs are disclosed herein. In some embodiments, an energy absorbing device includes a body having first and second apertures that receive a portion of a web, such as a web of an occupant restraint system. When a load is applied to the web, such as in a vehicle crash, the body deflects under the load from a first shape to a second shape to absorb the energy transmitted by the web.

17 Claims, 6 Drawing Sheets

(51) Int. Cl.
 *B60R 22/12* (2006.01)
 *B60N 2/28* (2006.01)

(58) Field of Classification Search
 CPC . B60R 22/00; B60R 2022/286; B60N 2/2809;
  B60N 2002/2815; B60N 2022/286; B60N
  2/22
 USPC .......... 188/371; 280/805; 297/216.11, 250.1
 See application file for complete search history.

(56) References Cited

U.S. PATENT DOCUMENTS

| | | | |
|---|---|---|---|
| 4,060,278 A * | 11/1977 | Maeyerspeer | B60R 22/28 297/472 |
| 4,243,266 A | 1/1981 | Anderson | |
| 4,527,830 A | 7/1985 | Meyers | |
| 4,660,889 A | 4/1987 | Anthony et al. | |
| 4,679,852 A | 7/1987 | Anthony et al. | |
| 4,738,485 A | 4/1988 | Rumpf | |
| 4,787,677 A | 11/1988 | Reighter | |
| 4,826,246 A | 5/1989 | Meeker | |
| 4,884,652 A | 12/1989 | Vollmer | |
| 4,948,199 A | 8/1990 | Weller | |
| 5,031,962 A | 7/1991 | Lee | |
| 5,039,169 A | 8/1991 | Bougher et al. | |
| 5,061,012 A | 10/1991 | Parker et al. | |
| 5,143,420 A | 8/1992 | Switlik | |
| 5,219,203 A | 7/1993 | Switlik | |
| 5,265,828 A | 11/1993 | Bennington | |
| 5,283,933 A | 2/1994 | Wiseman et al. | |
| 5,286,090 A | 2/1994 | Templin et al. | |
| 5,377,386 A | 1/1995 | Griffith | |
| 5,383,708 A | 1/1995 | Nagasaka et al. | |
| 5,466,044 A | 11/1995 | Barley et al. | |
| 5,487,588 A | 1/1996 | Burleigh et al. | |
| 5,511,856 A | 4/1996 | Merrick et al. | |
| 5,524,928 A | 6/1996 | Monagas | |
| 5,524,965 A | 6/1996 | Barley | |
| 5,536,066 A | 7/1996 | Sedlack | |
| 5,560,565 A | 10/1996 | Merrick et al. | |
| 5,588,189 A | 12/1996 | Gorman et al. | |
| 5,605,375 A | 2/1997 | Friedrich et al. | |
| 5,606,783 A | 3/1997 | Gillis et al. | |
| 5,611,597 A | 3/1997 | Lanz | |
| 5,628,548 A | 5/1997 | Lacoste | |
| 5,669,663 A | 9/1997 | Feuerherdt | |
| 5,695,243 A | 12/1997 | Anthony et al. | |
| 5,779,319 A | 7/1998 | Merrick | |
| 5,816,651 A | 10/1998 | Feuerherdt | |
| 5,839,793 A | 11/1998 | Merrick et al. | |
| 5,873,599 A | 2/1999 | Bauer et al. | |
| 5,873,635 A | 2/1999 | Merrick | |
| 5,890,762 A | 4/1999 | Yoshida | |
| 5,908,223 A | 6/1999 | Miller | |
| 5,915,787 A | 6/1999 | Brookman | |
| 5,918,834 A | 7/1999 | Siegrist | |
| 5,941,601 A | 8/1999 | Scott et al. | |
| 5,979,982 A | 11/1999 | Nakagawa | |
| 5,996,192 A | 12/1999 | Haines et al. | |
| 6,017,087 A | 1/2000 | Anthony et al. | |
| 6,030,046 A | 2/2000 | Dorow | |
| 6,082,819 A | 7/2000 | Jackson | |
| 6,182,783 B1 | 2/2001 | Bayley | |
| 6,183,044 B1 | 2/2001 | Koyanagi et al. | |
| 6,209,957 B1 | 4/2001 | Baloga et al. | |
| 6,220,662 B1 | 4/2001 | Franco-Vila et al. | |
| 6,260,925 B1 | 7/2001 | Miller | |
| 6,343,837 B1 | 2/2002 | Gage | |
| 6,357,790 B1 | 3/2002 | Swann et al. | |
| 6,402,250 B1 | 6/2002 | Stoll | |
| 6,425,632 B1 | 6/2002 | Anthony et al. | |
| 6,447,060 B1 | 9/2002 | Vila et al. | |
| 6,450,576 B1 | 9/2002 | Rhein et al. | |
| 6,463,638 B1 | 10/2002 | Pontaoe | |
| 6,517,154 B2 | 2/2003 | Sawamoto | |
| 6,543,722 B1 | 4/2003 | Parrow et al. | |
| 6,561,588 B1 | 5/2003 | Brady | |
| 6,616,242 B1 | 9/2003 | Stoll | |
| 6,669,288 B2 | 12/2003 | Nakagawa et al. | |
| 6,694,577 B2 | 2/2004 | Di Perrero | |
| 6,764,135 B2 | 7/2004 | Sasaki et al. | |
| 6,767,057 B2 | 7/2004 | Neelis | |
| 6,767,058 B2 | 7/2004 | McClellan-Derrickson | |
| 6,772,973 B2 | 8/2004 | Fujii et al. | |
| 6,820,310 B2 | 11/2004 | Woodard et al. | |
| 6,962,394 B2 | 11/2005 | Anthony et al. | |
| 6,979,057 B2 | 12/2005 | Sedlack | |
| 7,011,341 B2 | 3/2006 | Herberg et al. | |
| 7,029,067 B2 | 4/2006 | Vits et al. | |
| 7,044,548 B2 | 5/2006 | Mullen et al. | |
| 7,077,475 B2 | 6/2006 | Boyle | |
| 7,144,085 B2 | 12/2006 | Vits et al. | |
| 7,159,285 B2 | 1/2007 | Karlsson | |
| 7,201,399 B2 | 4/2007 | Frank et al. | |
| 7,246,854 B2 | 7/2007 | Dingman et al. | |
| 7,278,684 B2 | 10/2007 | Boyle | |
| 7,347,494 B2 | 3/2008 | Boyle et al. | |
| 7,464,989 B2 | 12/2008 | Merrill | |
| 7,488,038 B2 | 2/2009 | Boyle et al. | |
| 7,770,969 B2 | 8/2010 | Boyle et al. | |
| 7,861,341 B2 | 1/2011 | Ayette | |
| 7,866,702 B2 * | 1/2011 | Murphy | B60R 22/18 280/805 |
| 2002/0000744 A1 | 1/2002 | Maciejczyk | |
| 2003/0057750 A1 | 3/2003 | Blackler | |
| 2004/0036345 A1 | 2/2004 | Herberg et al. | |
| 2004/0095004 A1 * | 5/2004 | Horton | B60N 2/2884 297/250.1 |
| 2005/0269846 A1 | 12/2005 | Vits et al. | |
| 2006/0071535 A1 * | 4/2006 | Kim | B60R 22/105 297/465 |
| 2006/0082129 A1 | 4/2006 | Dingman et al. | |
| 2006/0082200 A1 | 4/2006 | Woellert et al. | |
| 2006/0103200 A1 | 5/2006 | Dingman et al. | |
| 2007/0024103 A1 | 2/2007 | Horton et al. | |
| 2007/0046014 A1 * | 3/2007 | Glover | B60N 2/2809 280/805 |
| 2007/0120001 A1 | 5/2007 | Esler et al. | |
| 2007/0210639 A1 * | 9/2007 | Berger | B60N 2/2884 297/470 |
| 2008/0012285 A1 | 1/2008 | Holbein et al. | |
| 2008/0072404 A1 * | 3/2008 | Wetter | B60R 22/48 24/68 R |
| 2008/0100051 A1 | 5/2008 | Bell et al. | |
| 2008/0100122 A1 | 5/2008 | Bell et al. | |
| 2008/0136225 A1 | 6/2008 | Murphy et al. | |
| 2008/0203793 A1 | 8/2008 | Boyle et al. | |
| 2008/0303325 A1 | 12/2008 | Scholz | |
| 2010/0219667 A1 | 2/2010 | Humbert et al. | |
| 2010/0253121 A1 | 10/2010 | Buckingham et al. | |
| 2010/0293759 A1 * | 11/2010 | Wada | A62B 35/04 24/265 EC |
| 2012/0181828 A1 * | 7/2012 | Cheng | B60N 2/2809 297/250.1 |
| 2015/0021926 A1 | 1/2015 | Szewczyk et al. | |
| 2017/0283079 A1 | 10/2017 | Meadows et al. | |

FOREIGN PATENT DOCUMENTS

| | | | |
|---|---|---|---|
| CA | 2038505 | 11/2000 | |
| CA | 2450995 | 12/2003 | |
| CA | 2551335 | 12/2006 | |
| DE | 2419193 | 11/1975 | |
| DE | 3900066 A1 * | 7/1989 | ............ B60R 22/28 |
| DE | 19738430 | 3/1999 | |
| DE | 102015224611 | 6/2017 | |
| DE | 102015224611 A1 * | 6/2017 | ............ B60R 22/28 |
| EP | 552570 | 12/1992 | |
| EP | 560184 | 9/1993 | |
| EP | 462930 | 8/1994 | |
| EP | 619201 | 10/1994 | |
| EP | 619202 | 10/1994 | |
| EP | 646491 | 4/1995 | |

(56) References Cited

FOREIGN PATENT DOCUMENTS

| | | | |
|---|---|---|---|
| EP | 703113 | 3/1996 | |
| EP | 714806 | 6/1996 | |
| EP | 841209 | 5/1998 | |
| EP | 970842 | 1/2000 | |
| EP | 982182 | 1/2000 | |
| EP | 1059194 | 12/2000 | |
| EP | 1193111 | 4/2002 | |
| EP | 1231100 | 8/2002 | |
| EP | 1472949 | 11/2004 | |
| EP | 1631166 | 9/2008 | |
| EP | 3564077 A1 * | 11/2019 | ............. B60R 22/28 |
| FR | 2857601 | 1/2005 | |
| GB | 2444591 A * | 6/2008 | ........... B60N 2/2809 |
| JP | 5254367 | 10/1993 | |
| JP | 10119611 | 5/1998 | |
| JP | 10119612 | 5/1998 | |
| JP | 2001030811 | 2/2001 | |
| WO | 03009717 | 2/2003 | |
| WO | 03010024 | 2/2003 | |
| WO | 03010035 | 2/2003 | |
| WO | 2005000625 | 1/2005 | |
| WO | 2005037605 | 4/2005 | |
| WO | 2005102112 | 11/2005 | |
| WO | 2006044559 | 4/2006 | |
| WO | 2006044627 | 4/2006 | |
| WO | 2006044809 | 4/2006 | |
| WO | 2006044830 | 4/2006 | |

OTHER PUBLICATIONS

Child Restraint Systems, Department of Aviation Administration, Federal Aviation Adm. 14 CFR, Aug. 2005.
Improving the Safety of Older Child Passengers, Nov. 2005.
International Search Report and Written Opinion for PCT Application No. PCT/US2007/66476, Applicant: AmSafe Commercial Products, Inc., dated Jan. 25, 2008, 10 pages.
International Search Report and Written Opinion for PCT Application No. PCT/US2009/31613, Applicant: AmSafe Commercial Products, Inc., dated Mar. 3, 2009, 9 pages.
International Search Report and Written Opinion for PCT Application No. PCT/US2009/58806; Applicant: AmSafe, Inc.; dated Jan. 20, 2010, 10 pages.
Restraint Use on Aircraft, American Academy of Pediatrics vol. 108, No. 5, Nov. 2001.
Safefit, Cover N' Carry Car Seat Protector, www.Amazon.com.
Safer Airplane Travel with Babies & Toddlers, www.saferidenews.com.
Tiny Air Travelers at Risk, Brad Watson Reports, Jan. 26, 2006.
Ultimate Black Car Seat Travel Bag, www.target.com.
Wheelie Car Seat Travel Bag by JL Childress, www.Go-Baby.com.
International Search Report and Written Opinion for PCT Application No. PCT/US2019/25513, Applicant: Shield Restraint Systems, Inc., dated Jun. 21, 2019, 8 pages.

* cited by examiner

ENERGY ABSORBING DEVICES FOR USE WITH WEBS

CROSS-REFERENCE TO RELATED APPLICATION

This application claims the benefit of U.S. Provisional Patent Application No. 62/652,670, titled "ENERGY ABSORBING DEVICES FOR USE WITH WEBS," and filed Apr. 4, 2018, the disclosure of which is hereby incorporated by reference in its entirety

TECHNICAL FIELD

The present disclosure is generally directed to energy absorbing devices for use with seat belts and other restraint system webs.

BACKGROUND

Many types of personal restraint systems are used in automobiles, utility task vehicles (UTVs), and other vehicles. Small children, for example, are typically secured in a portable child seat that can be mounted to a passenger seat in an automobile or other vehicle. The child seat can be secured to the passenger seat by attaching one or more straps, belts, etc., (e.g., webs) from the child seat to corresponding anchor points in the vehicle, and then adjusting the tension in the webs to securely hold the child seat in place. During a crash or other significant dynamic event, substantial loads can be applied to the webs as the vehicle rapidly decelerates. Some webs are made of a material that stretches slightly and can absorb some energy during a crash, but the anchor points in the vehicle are generally rigid and offer little energy absorption. As a result, significant shock loads can be transmitted to the child seat during a crash.

BRIEF DESCRIPTION OF THE DRAWINGS

Many aspects of the present disclosure can be better understood with reference to the following drawings. The components in the drawings are not necessarily to scale. Instead, emphasis is placed on clearly illustrating the principles of the present technology.

DETAILED DESCRIPTION

The following disclosure describes various embodiments of devices for absorbing energy transmitted by seat belts or other webs. For example, some embodiments of the present technology are directed to an energy absorbing device having a generally U-shaped body with first and second leg portions. A web, such as a web that securely attaches a child seat to an anchor point in a vehicle, can be threaded through the device by passing the web through apertures in the first and second leg portions. Upon application of a load to the web (e.g., during a crash), the first and second leg portions deflect and absorb a portion of the energy transmitted by the web to thereby reduce the shock on the child in the child seat.

Certain details are set forth in the following description and in FIGS. 1A-6 to provide a thorough understanding of various embodiments of the present technology. In other instances, well-known structures, materials, operations and/or systems often associated with webs, web adjusters, and other personal restraint system hardware are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the present technology. Accordingly, other embodiments can have other details, dimensions, angles and features without departing from the scope of the present technology. In addition, those of ordinary skill in the art will appreciate that further embodiments of the present technology can be practiced without several of the details described below.

Figure 1A:
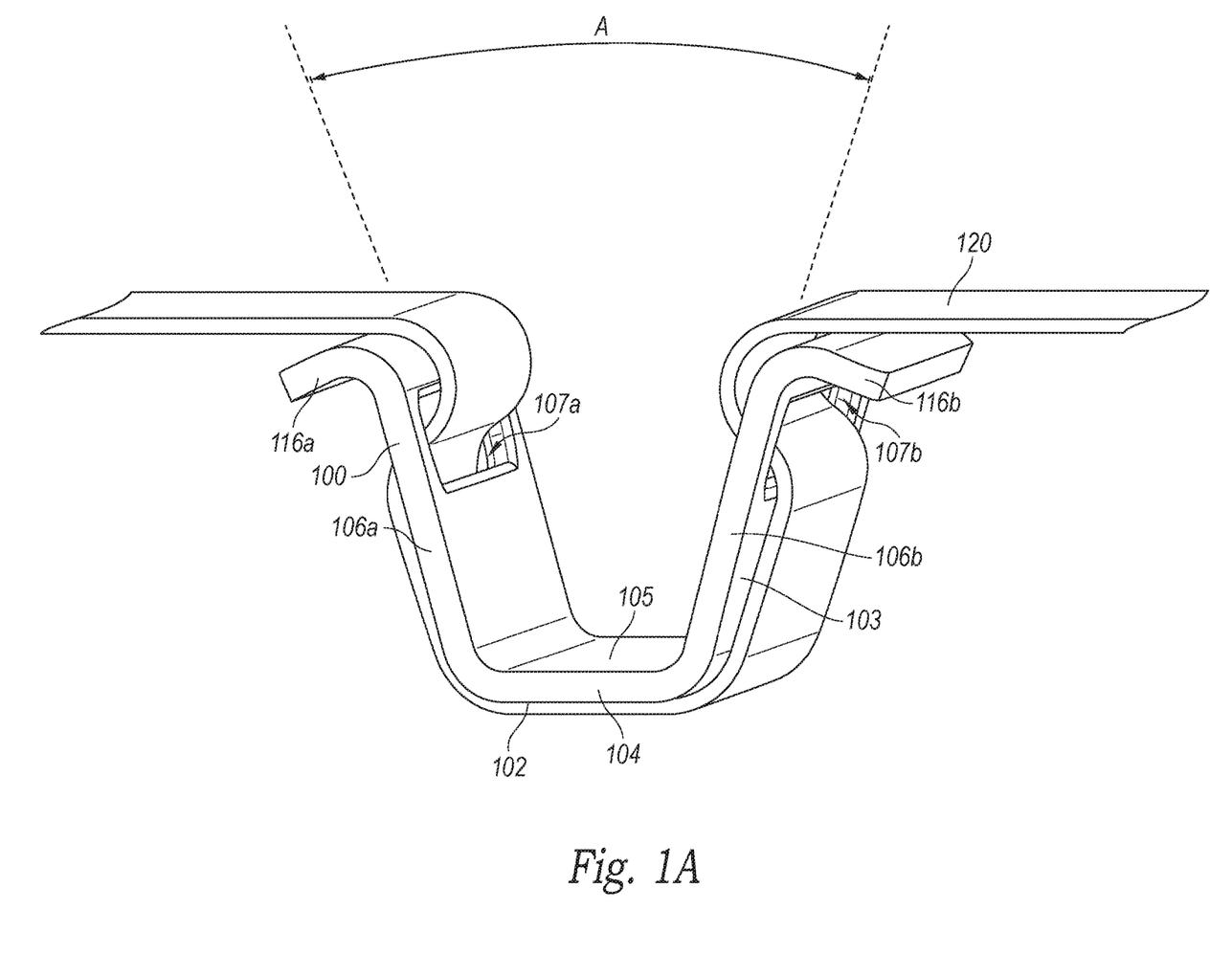
FIGS. 1A and 1B are isometric views of an energy absorbing device in a first position and a second position, respectively, configured in accordance with an embodiment of the present of the technology.
Figure 1B:
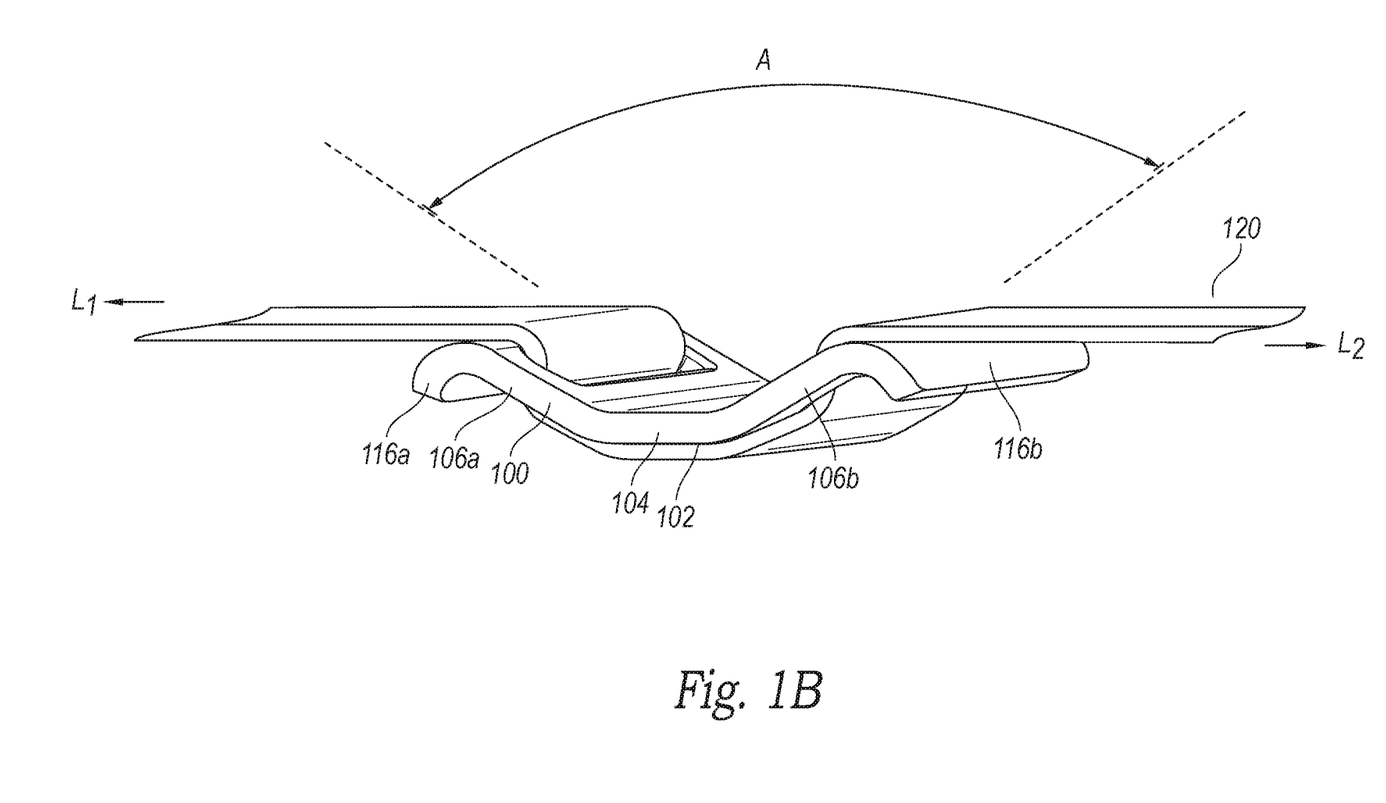

FIGS. 1A and 1B are isometric views of an energy absorbing device 100 ("device 100") in a first position (e.g., having a first shape) and a second position (e.g., having a second shape), respectively, configured in accordance with an embodiment of the present technology. Referring to FIG. 1A, the device 100 includes a generally V- or U-shaped body 102 having an outer surface 103 and an inner surface 105. The body 102 includes a base portion 104, a first leg portion 106a extending from one side of the base portion 104, and a second leg portion 106b extending from an opposite side of the base portion 104. In the illustrated embodiment, the leg portions 106a, b are generally planar and extend away from each other, defining an angle A therebetween. In other embodiments, the leg portions 106a, b can be non-planar (e.g., curved) and/or the leg portions 106a, b can extend generally toward or parallel to each other.

The first leg portion 106a includes a first web aperture 107a (e.g., a generally rectangular opening) that extends generally lengthwise across the first leg portion 106a proximate to a distal end portion 116a of the first leg portion 106a. Similarly, the second leg portion 106b includes a second web aperture 107b that extends generally lengthwise across the second leg portion 106b proximate to a distal end portion 116b of the second leg portion 106b. In other embodiments, the web apertures 107a, b can have circular, square, rectangular, polygonal, irregular, or other shapes, and/or can be positioned differently on the leg portions 106a, b.

The device 100 can be manufactured using suitable materials and methods known in the art. For example, in some embodiments, the device 100 can be formed from a suitable steel plate (e.g., a high-strength low-alloy (HSLA) steel) that is stamped and formed, and/or machined to shape. In other embodiments, the device 100 can be formed from composite materials or can be injection molded from a suitable plastic.

In another aspect of the illustrated embodiment, a web 120 can be inserted through the web apertures 107a, b such that the web 120 extends around the distal end portions 116a, 116b and around a portion of the outer surface 103 between the web apertures 107a, b. The web 120 can be any type of web, strap, seat belt web, etc., well known in the art for use with seat belt and other restraint systems, and can be constructed of various suitable materials known in the art, such as woven nylon.

Figure 2:
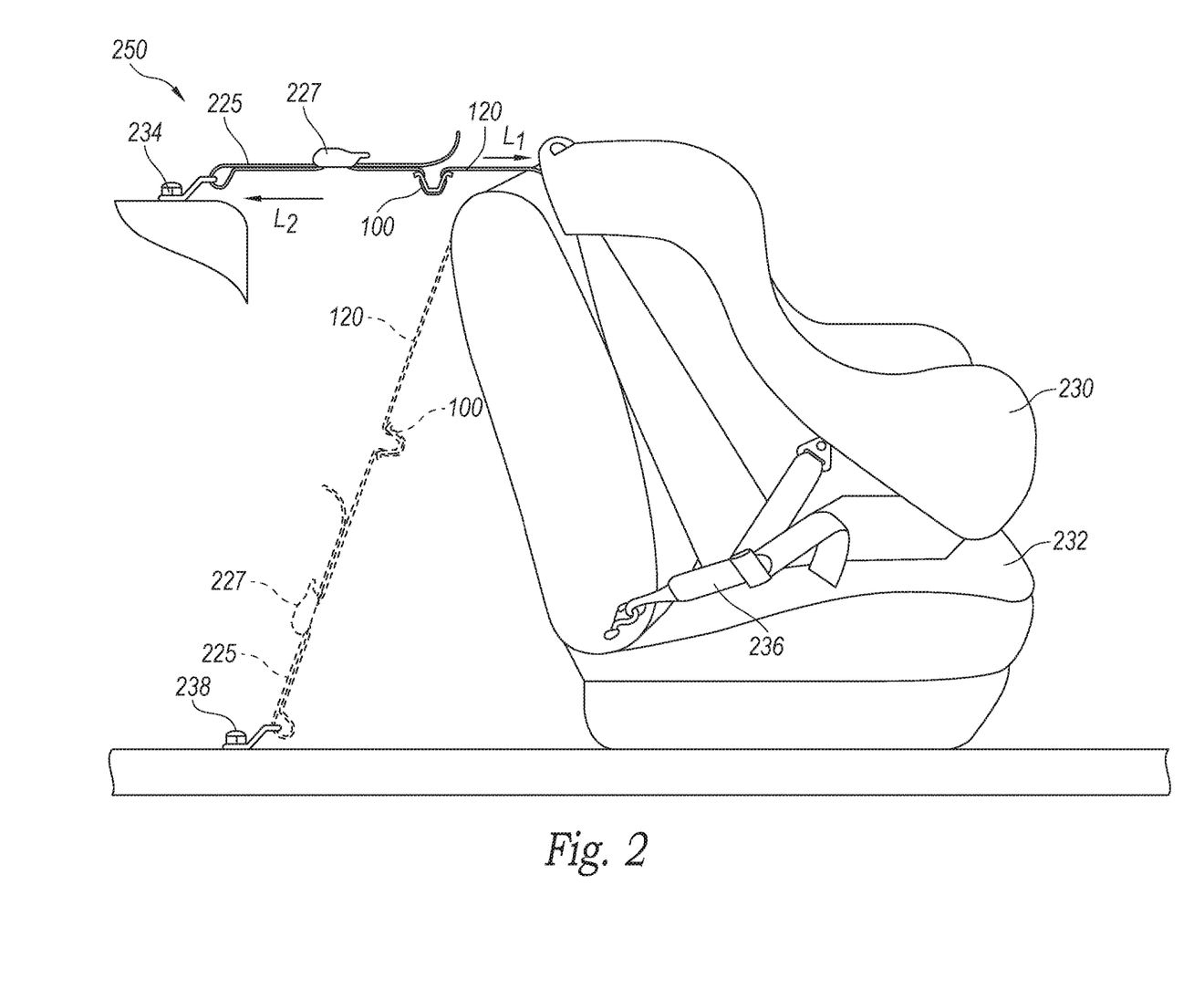
FIG. 2 is a side view of a child seat secured to a vehicle seat with a restraint system having an energy absorbing device configured in accordance with an embodiment of the present technology.

The device 100 can be used to absorb energy and reduce shock loads in a wide variety of applications. FIG. 2, for example, is a side view of a child seat 230 secured to a car seat 232 with a restraint system 250 that includes the device 100. The device 100 can be easily installed onto pre-existing restraint systems. For example, the first web 120 can be threaded through the device 100 during installation of the child seat 230. In the illustrated embodiment, an upper portion of the child seat 230 is securely attached to an upper anchor 234 in a vehicle by means of the web 120 (e.g., referred to here as the first web 120) and a second web 225. The first web 120 and the second web 225 are coupled together by a web adjuster 227 (e.g., a tilt-lock web adjuster, a push-button web adjuster, etc.) that is operable to adjust the tension in the first and second webs 120, 225. Although the device 100 is coupled to the first web 120, in other embodiments the device 100 can be coupled to the second web 225, and/or the restraint system 250 can include multiple devices 100 (e.g., one coupled to the first web 120 and another coupled to the second web 225). Additionally, in other embodiments the web adjuster 227 can be omitted.

In other embodiments, the upper portion of the child seat 230 and/or other portions of the child seat 230 can be secured to a lower anchor 238 by means of the first and second webs 120, 225 as illustrated in phantom lines in FIG. 2. A lower portion of the child seat 230 can be secured to the car seat 232 with additional restraints, such as a restraint 236 of a type well known to those of ordinary skill in the art. In some embodiments, the device 100 may be employed in a LATCH (Lower Anchor and Tethers for Children) system to attach a child restraint system to a vehicle seat. In other embodiments, the device 100 can be used with various other web arrangements without departing from the scope of the present technology.

Referring to FIGS. 1A-2 together, when a load is applied to the web 120 (e.g., during a crash or other rapid deceleration event), the device 100 deflects from the first position shown in FIG. 1A to the second position shown in FIG. 1B in response to the load to absorb energy transmitted by the web 120. More specifically, when a tension load (indicated by arrows $L_1$ and $L_2$) is applied to the web 120, the tension force in the web 120 is transmitted to the device 100 via the distal end portions 116a, b and pulls the leg portions 106a, b away from each other as shown in FIG. 1B. That is, the load applied to the web 120 causes the leg portions 106a, b to move outwardly about the base portion 104, increasing the angle A. In some embodiments, the angle A can be less than about 90° in the first position, and between about 90°-180° in the second position. Accordingly, in the second position, the device 100 has a greater lateral spacing between the distal end portions 116a, b and less vertical height (between the base portion 104 and the distal end portions 116a, b) than in the first position. The deflection, or the deflection and deformation, of the device 100 absorbs at least a portion of the shock energy during a rapid deceleration event that would otherwise be transmitted to the child seat 230 via the web 120—thereby reducing the shock exerted on the child in the seat 230.

In some embodiments, the device 100 fully or partially returns to the first position from the second position after the load in the web 120 is relieved. In other embodiments, the device 100 is configured to at least partially deform and not return fully to the first position after sustaining the load in the web 120. In some embodiments, the device 100 is configured to deflect and deform when the load applied to the web 120 is greater than or equal to a particular load value or "design-level load." For example, the device 100 can be configured to deflect and deform at a design-level load of between about 500-1500 lbf. In some embodiments, the device 100 deforms and does not return fully to the first position to provide a visual indication that the device 100 has been subjected to a design level load and may need inspection and/or replacement. More generally, the shape and size of the leg portions 106a, b, the material type and mechanical properties, and the thickness of the body 102 can be selected to provide a desired level of deflection/deformation of the device 100 at any of a variety of design-level loads. For example, increasing the thickness of the body 102, decreasing the length of the leg portions 106a, b, or increasing the modulus of elasticity of the material used to form the body 102 can provide a corresponding increase in the design-level load at which the device 100 deflects and deforms. These and other features can be selected and modified to match or correspond to a calculated design-level load. In some embodiments, for example, the body 102 can have a thickness of between about 0.5-2.0 mm and/or the leg portions 106a, b can have a length of between about 5-30 mm.

In another aspect of the illustrated embodiment, the device 100 is configured so that it does not directly carry the entire load applied to the web 120. Accordingly, the device 100 does not need to be designed to carry the relatively high loads that are carried by the web 120 (e.g., from about 2000-2500 lbf), and can have a design-level load significantly less than the maximum load-carrying capacity of the web 120. In some embodiments, once the device 100 has partially or fully deformed (to, e.g., the second position), the web 120 carries all, or a substantial portion, of the applied load. In other embodiments, the device 100 can be configured to carry the entire load in the web 120. For example, in some embodiments the web 120 can comprise separate first and second webs that can be securely attached to, for example, the distal end portions 116a, b of the device 100—rather than inserted through the web apertures 107a, b.

Figure 3A:
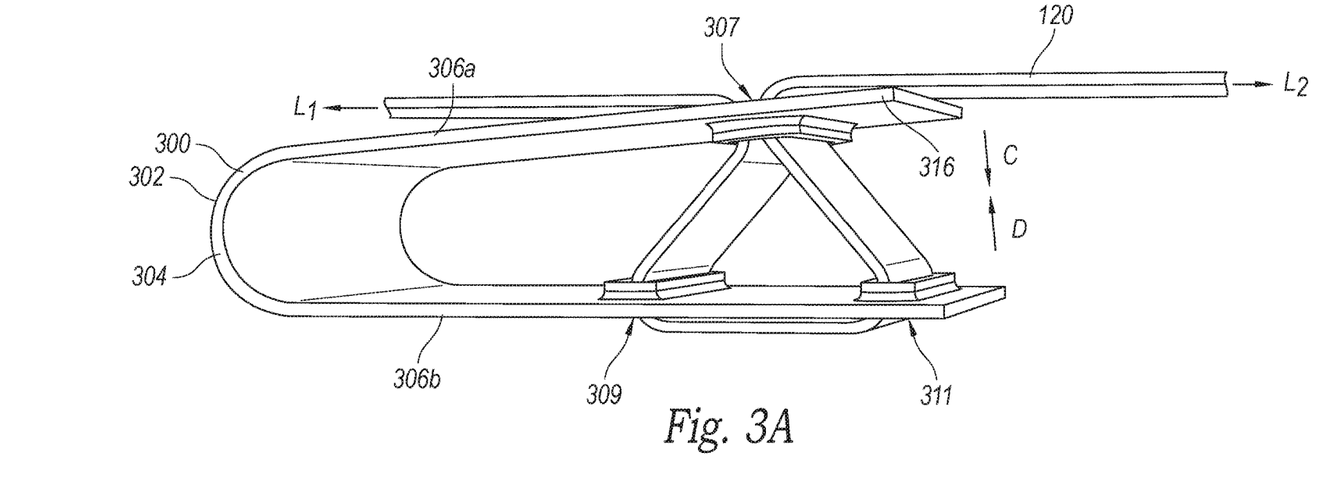
FIGS. 3A and 3B are isometric and isometric cross-sectional views, respectively, of an energy absorbing device configured in accordance with another embodiment of the present technology.
Figure 3B:
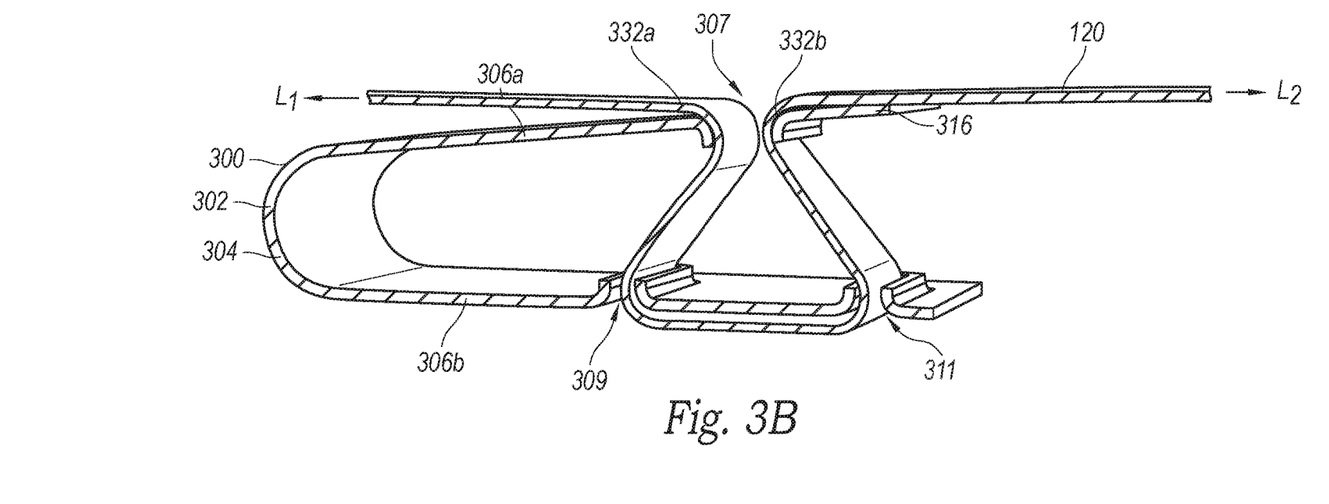

FIGS. 3A and 3B are isometric and isometric cross-sectional views, respectively, of an energy absorbing device 300 ("device 300") configured in accordance with another embodiment of the present technology. Referring to FIGS. 3A and 3B together, the device 300 includes some features that are generally similar in structure and function to features of the device 100 described in detail above with reference to FIGS. 1A-2. For example, the device 300 includes a generally U-shaped body 302 having a base portion 304, and first and second leg portions 306a, b, respectively, extending from opposite sides of the base portion 304. In the illustrated embodiment, however, the base portion 304 has a generally curved shape and the device 300 includes three web apertures. More specifically, the first leg portion 306a includes a first web aperture 307 that extends generally lengthwise across a distal end portion of the first leg portion 306a and includes a first edge 332a and an opposite second edge 332b. The second leg portion 308 includes a second web aperture 309 spaced apart from a third web aperture 311. The web 120 can be inserted through the first, second, and third web apertures 307, 309, and 311 such that the web 120 extends generally (a) through the first web aperture 307 around the first edge 332a, (b) along an outer surface of the second leg portion 308 between the second and third web apertures 309, 311, and (c) back through the first web aperture 307 around the second edge 332b.

When a tension load is applied to the web 120, the tension force in the web pulls the leg portions 306a, b toward each other, which absorbs and dissipates the shock energy transmitted by the web 120. Specifically, when a tension load (represented by the arrows $L_1$ and $L_2$) is applied to the web 120 (via, e.g., a crash or other rapid deceleration of the vehicle), the tension in the web 120 pulls the leg portions 306a, b inwardly toward each other in the directions indicated by arrows C and D, respectively (FIG. 3A). In some embodiments, the leg portions 306a, b are configured to deform and remain pinched inwardly after the load (e.g., a design-level load) is applied to the web 120 to provide a visual indication that the device has been subjected to a design level load and may need inspection and/or replacement. In other embodiments, then leg portions 306a, b are configured to deflect inward when the load is applied to the web 120 and return outwardly away from each other thereafter.

Figure 4A:
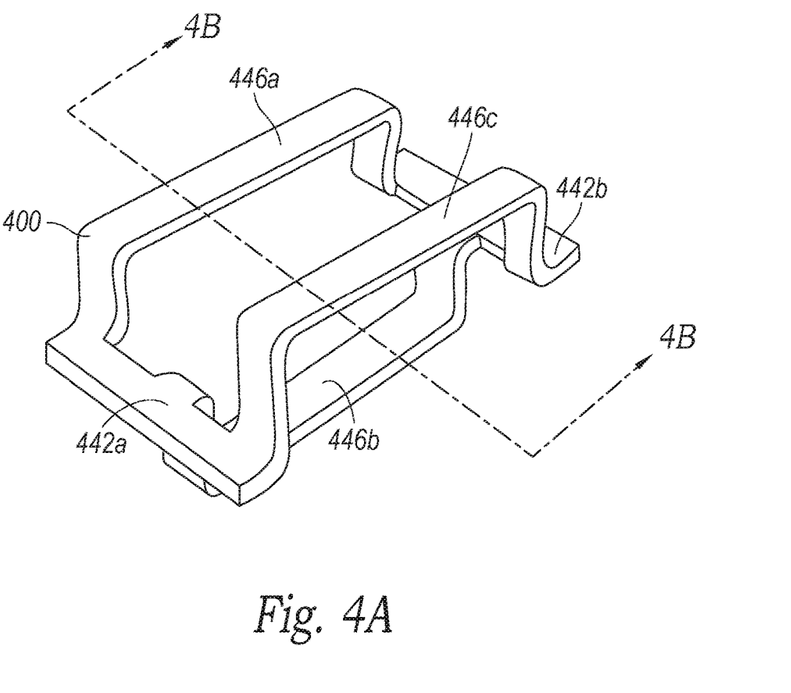
FIGS. 4A and 4B are isometric and side cross-sectional views, respectively, of an energy absorbing device configured in accordance with a further embodiment of the present technology.
Figure 4B:
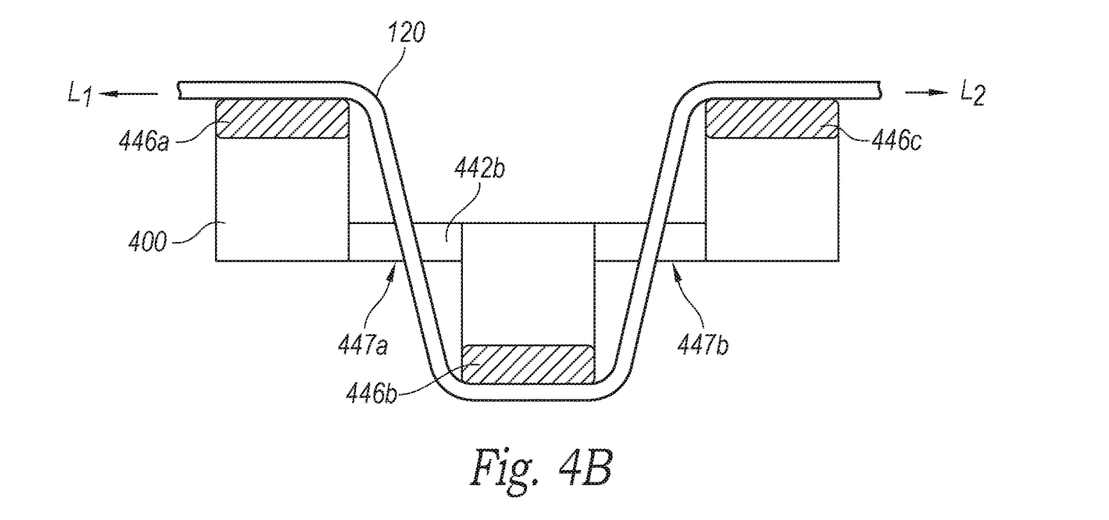

Although FIGS. 1A-3B illustrate embodiments of energy absorbing devices having leg portions configured to move away from and/or toward each other to absorb and/or dissipate a shock load applied to a web, energy absorbing devices according to the present technology can have other shapes, configurations, etc. For example, FIGS. 4A and 4B are isometric and side cross-sectional views, respectively, of an energy absorbing device 400 ("device 400") configured in accordance with another embodiment of the present technology. Referring to FIGS. 4A and 4B together, the device 400 includes generally planar first and second side portions 442a, b, respectively, and first, second, and third cross members 446a, b, c, respectively, extending between the side portions 442a, b. The side portions 442a, b and the cross members 446a, b, c together define first and second web apertures 447a, b, respectively. In the illustrated embodiment, the first and third cross members 446a, 446c extend generally above the side portions 442a, b while the second cross member 446b extends generally below the side portions 442a, b.

As shown in FIG. 4B, the web 120 can be inserted through the web apertures 447a, b such that the web 120 extends over the first cross member 446a, through the first web aperture 447a, under the second cross member 446b, through the second web aperture 447b, and over the third cross member 446c. When a tension load is applied to the web 120, the device 400 deflects and deforms such that the cross members 446a, b, c move generally inwardly and absorb a portion of the energy transmitted by the web 120. More specifically, when a tension load (represented by the arrows $L_1$ and $L_2$) is applied to the web 120, the tension force pulls the cross members 446a, b, c inwardly toward a plane coplanar with the side portions 442a, b. In some embodiments, the tension force can further cause the cross members 446a, b, c to at least partially deflect laterally such that the device 400 has a greater width (e.g., in a direction parallel to the cross members 446a, b, c) after the load is applied to the web 120.

Figure 5:
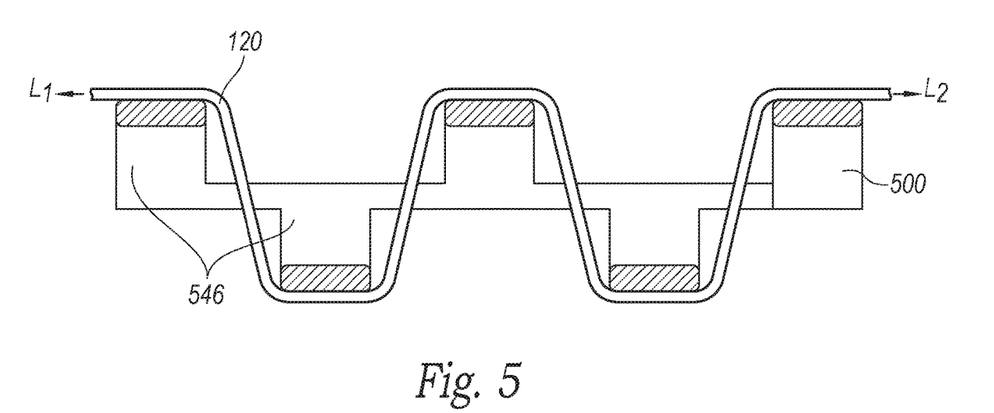
FIG. 5 is a side cross-sectional view of an energy absorbing device configured in accordance with yet another embodiment of the present technology.

In some embodiments, energy absorbing devices configured in accordance with the present technology can include more or fewer than the three cross members illustrated in FIGS. 4A and 4B. For example, FIG. 5 is a side cross-sectional view of an energy absorbing device 500 ("device 500") having five cross members 546 that are generally similar to the cross members 446a, b, c described in detail above with reference to FIGS. 4A and 4B. In some embodiments, the device 500 has a larger design-level load than the device 400 since it has a greater number of cross members for absorbing a tension load applied to the web 120.

Figure 6:
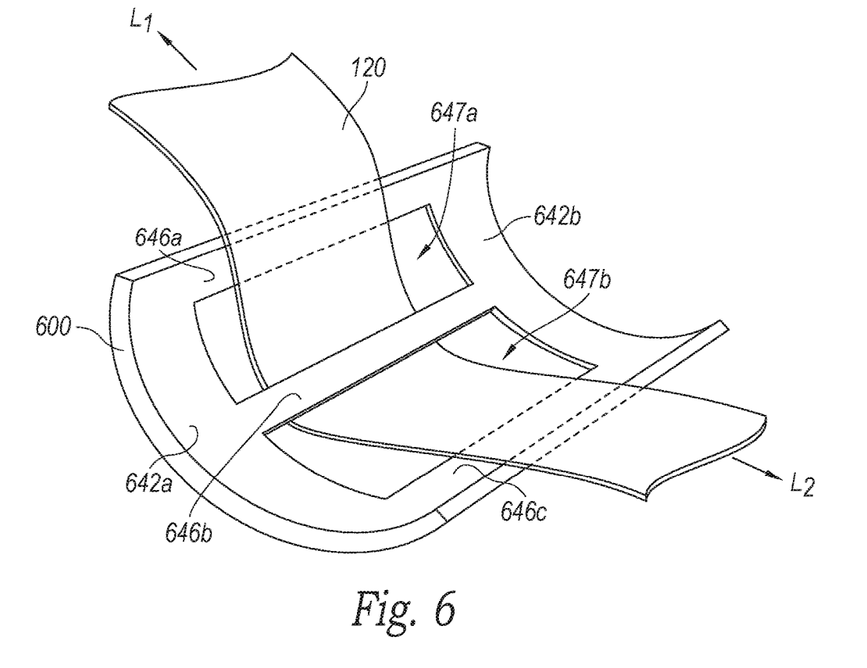
FIG. 6 is an isometric view of an energy absorbing device configured in accordance with a further embodiment of the present technology.

FIG. 6 is an isometric view of an energy absorbing device 600 ("device 600") configured in accordance with another embodiment of the present technology. The device 600 includes some features that are generally similar to features of the devices 400 and 500 described in detail above with reference to FIGS. 4A-5. For example, the device 600 includes first, second, and third cross members 646a, b, c, respectively, extending between first and second side portions 642a, b, respectively. The side portions 642a, b and the cross members 646a, b, c together define first and second web apertures 647a, b, respectively. In the illustrated embodiment, however, the device 600 has a generally curved shape in which the side portions 642a, b are generally rounded (e.g., broadly U-shaped) and the cross members 646a, b, c are generally linear or planar.

The web 120 can be inserted through the web apertures 647a, b and around the second cross member 646b as shown. When a tension load is applied to the web 120, the device 600 deflects from its generally curved shape to a flatter shape (e.g., having a greater radius of curvature and/or no curvature) and absorbs and/or dissipates the shock energy transmitted by the web 120. More specifically, when a tension load (represented by the arrows L1 and L2) is applied to the web 120, the tension force is transmitted to the device 600 via the cross members 646a, b, c and causes the side portions 642a, b to generally straighten relative to their shape before the load was applied to the web 120. Thus, in some embodiments, the device 600 has a greater length after the load is applied to the web 120.

The foregoing description of embodiments of the technology is not intended to be exhaustive or to limit the disclosed technology to the precise embodiments disclosed. While specific embodiments of, and examples for, the present technology are described herein for illustrative purposes, various equivalent modifications are possible within the scope of the present technology, as those of ordinary skill in the relevant art will recognize. For example, although the energy absorbing devices illustrated in FIGS. 1A-6 are described in the context of webs used in child seats, those of ordinary skill in the art will understand that the energy absorbing devices described herein can be utilized in a wide variety of other applications utilizing webs as restraints or tethers. For example, the energy absorbing devices of the present technology could be advantageously used in fall-arrest harness systems (e.g., employed at a construction site), recreational utility vehicles (RUVs), automobiles, etc. Accordingly, the energy absorbing devices described herein are not limited to use in any particular restraint system, but can be used with a wide-variety of such systems without departing from the present disclosure. Further, various aspects of the technology described herein can be combined to provide yet other embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to," Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

From the foregoing, it will be appreciated that specific embodiments of the disclosed technology have been described herein for purposes of illustration, but that various modifications may be made without deviating from the present technology. Certain aspects of the disclosure described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the disclosed technology. Accordingly, the disclosure and associated technology can encompass other embodiments not expressly shown or described herein.

In general, the terms used in the following claims should not be construed to limit the present technology to the specific embodiments disclosed in the specification, unless the above-detailed description explicitly defines such terms. Accordingly, the actual scope of the present technology encompasses the disclosed embodiments and all equivalent ways of practicing or implementing the disclosure under the claims.

We claim:

1. An energy absorbing device for use with an occupant restraint system having a restraint web, the energy absorbing device comprising:
    a body having a first leg portion and a second leg portion spaced apart from the first leg portion,
        wherein the first leg portion includes a first web aperture configured to receive the restraint web therethrough,
        wherein the second leg portion includes a second web aperture configured to receive the restraint web therethrough, and
        wherein, when a tension load is applied to the restraint web, the first leg portion is configured to move toward the second leg portion to absorb energy in the restraint web.

2. The energy absorbing device of claim 1 wherein the second leg portion further includes a third web aperture configured to receive the restraint web therethrough.

3. The energy absorbing device of claim 2 wherein the energy absorbing device is configured to receive the restraint web routed (a) through the first web aperture, (b) through the second web aperture, (c) through the third web aperture, and (d) back through the first web aperture.

4. The energy absorbing device of claim 1 wherein the leg portions are configured to move from a first position to a second position different than the first position when the tension load is applied to the restraint web, and wherein the leg portions are configured to elastically return to the first position from the second position after the tension load is applied to the restraint web.

5. The energy absorbing device of claim 1 wherein the leg portions are configured to move from a first position to a second position different than the first position when the tension load is applied to the restraint web, and wherein the leg portions are configured to at least partially deform and not fully return to the first position after the tension load is applied to the restraint web.

6. The energy absorbing device of claim 1 wherein the first web aperture is a generally rectangular opening that extends generally lengthwise across the first leg portion proximate to a distal end portion of the first leg portion, and wherein the second web aperture is a generally rectangular opening that extends generally lengthwise across the second leg portion proximate to a distal end portion of the second leg portion.

7. The energy absorbing device of claim 1, further comprising the restraint web.

8. An energy absorbing device for use with an occupant restraint system having a restraint web, the energy absorbing device comprising:
    a body having a first leg portion and a second leg portion spaced apart from the first leg portion,
        wherein the first leg portion includes a first web aperture configured to receive the restraint web therethrough,
        wherein the second leg portion includes a second web aperture configured to receive the restraint web therethrough,
        wherein the leg portions define an angle therebetween, and
        wherein, when a tension load is applied to the restraint web, the first leg portion is configured to move relative to the second leg portion such that the angle decreases to absorb energy in the restraint web.

9. An energy absorbing device for use with an occupant restraint system having a restraint web, the energy absorbing device comprising:
    a body including a first side portion, a second side portion, and a plurality of cross members extending between the first and second side portions,
        wherein the first and second side portions and the cross members together define (a) a first web aperture configured to receive the restraint web therethrough and (b) a second web aperture configured to receive the restraint web therethrough, and
        wherein, when a tension load is applied to the restraint web, at least two of the cross members are configured to move inwardly toward each other to absorb energy in the restraint web.

10. The energy absorbing device of claim 9 wherein the first and second side portions are generally coplanar along a plane, and wherein the cross members are configured to move inwardly toward the plane when the tension load is applied to the restraint web.

11. The energy absorbing device of claim 9 wherein the plurality of cross members include—
   a first cross member extending between the first and second side portions and offset from the first and second side portions in a first direction;
   a second cross member extending between the first and second side portions and offset from the first and second side portions in the first direction; and
   a third cross member extending between the first and second side portions and offset from the first and second side portions in a second direction, opposite to the first direction.

12. The energy absorbing device of claim 11 wherein the first and second cross members are configured to receive the restraint web thereover, and wherein the third cross member is configured to receive the restraint web thereunder.

13. The energy absorbing device of claim 9 wherein the plurality of cross members includes at least three cross members.

14. The energy absorbing device of claim 9, further comprising the restraint web.

15. An energy absorbing device for use with an occupant restraint system having a restraint web, the energy absorbing device comprising:
   a body including a first side portion, a second side portion, and a plurality of cross members extending between the first and second side portions,
      wherein the first and second side portions and the cross members together define (a) a first web aperture configured to receive the restraint web therethrough and (b) a second web aperture configured to receive the restraint web therethrough,
      wherein the first and second side portions each have a generally curved shape, and
      wherein, when a tension load is applied to the restraint web, the first and second side portions are configured to deflect from the generally curved shape to a flatter shape to absorb energy in the restraint web.

16. The energy absorbing device of claim 15 wherein each of the cross members are generally planar.

17. The energy absorbing device of claim 15 wherein the first and second side portions are configured to at least partially deform and not fully return to the generally curved shape after the tension load is applied to the restraint web.

* * * * *